US007228736B2

(12) United States Patent
Smith

(10) Patent No.: US 7,228,736 B2
(45) Date of Patent: Jun. 12, 2007

(54) BIN LEVEL INDICATOR

(76) Inventor: Daniel R. Smith, 101 Lake Dr., DeBary, FL (US) 32713

( * ) Notice: Subject to any disclaimer, the term of this patent is extended or adjusted under 35 U.S.C. 154(b) by 111 days.

(21) Appl. No.: 11/206,560

(22) Filed: Aug. 19, 2005

(65) Prior Publication Data

US 2007/0039384 A1    Feb. 22, 2007

(51) Int. Cl.
   *B65B 1/30* (2006.01)
(52) U.S. Cl. ............................ 73/299; 141/95
(58) Field of Classification Search ............ None
   See application file for complete search history.

(56) References Cited

U.S. PATENT DOCUMENTS

| 3,290,938 A | 12/1966 | Miller |
| 3,401,562 A | 9/1968 | Reaney |
| 3,459,035 A | 8/1969 | Russon |
| 3,734,313 A | 5/1973 | Gauthier et al. |
| 3,994,169 A | 11/1976 | Wolford |
| 4,058,230 A | 11/1977 | Bellenberg et al. |
| 4,241,606 A | 12/1980 | Vandenhoeck |
| 4,807,672 A | 2/1989 | Sherk et al. |

*Primary Examiner*—Hezron Williams
*Assistant Examiner*—Paul M. West
(74) *Attorney, Agent, or Firm*—Julian C. Renfro, Esquire

(57) ABSTRACT

A sensor involving a housing having a lower orifice to which a primary hose is connected. A secondary hose inside the primary hose is slightly shorter than the primary hose, with these hoses being placed inside a bin for determining fill level. One of two upper orifices in the housing is connected to a supply of air under pressure, with this air normally caused to flow outwardly from one of the hoses. Upon the degree of the fill of the bin being such that the material approaches the remote end of one of the hoses, the air normally flowing from the one hose is caused to be deflected into the remote end of the other of the hoses, causing a pressure increase. This pressure increase is directed through the other upper orifice, for being sensed at remotely located pressure sensing equipment.

17 Claims, 4 Drawing Sheets

BIN LEVEL INDICATOR

BACKGROUND OF THE INVENTION

The present invention pertains to systems for measuring and indicating the depth of material in a container, such as a bin containing fertilizer.

There are many instances in which it is desirable or necessary to provide a quick measurement of the amount of material stored in a container. In a typical industrial or agricultural setting, a bin or other container is provided for temporary storage of some material, such as fertilizer, grain, feed, cement, carbon black, etc. It is typical for quantities of material to be added to or withdrawn from the container from time to time, and the need arises for knowing the amount of material in the container at any given moment.

It is not realistically possible to provide actual measurement of quantities of material added to and withdrawn from the container, in order to maintain a tally of its actual contents. Such schemes are generally not practical because of the length of time and degree of compleixty involved in making actual measurements of the material. Rather, it is generally preferable to allow for rapid adding or subtracting of material from the container, such as by conveyor, dump truck, auger, or the like, without the necessity of actual measurement of the material so added or removed. This in turn implies a need for an indirect means of measurement, and preferably one which is quickly and accurately made.

Since the total volume of a given container is known, having once been measured or calculated, the simplest method of measuring material in such container involves measurement of the depth of the material at a given time. Because visual inspection is generally inconvenient or impractical, various systems have been proposed in the prior art for measurement of the depth of the material by means of a sensor or sensors placed within the container, and some type of readout means located externally of the bin, such as an office which contains readouts for numerous containers in a given installation.

Sensors for measuring depth of granular material in containers have been proposed which operate electrically, or by fluid pressure. In either case, an elongate sensor or a plurality of sensors may be placed vertically in the container so as to be progressively immersed in the material as it is added to the container.

Prior art fluid type systems have been proposed, which involve the use of an elongate sensor mounted vertically in the bin. The sensor has a movable or flexible portion which is intended to be compressed by the accumulating material in the bin so as to displace a quantity of fluid from within the sensor. The fluid bellow or the like is then provided to measure the displaced fluid.

Regardless of whether operated by mechanical or electrical means, prior art systems have suffered from certain problems and inaccuracy due to the amount of force required to actuate or compress the sensor. This is because most dry products develop horizontal forces which are very low compared to the weight per cubic foot of material. This is especially true of very light materials such as carbon black or sawdust, in which the very low horizontal forces approach the limits of the sensitivity of prior art sensors.

Typical prior art fluid systems use a flexible member or diaphragm defining an air passage, positioned vertically in the container. A fluid communication line from the top of the sensor connects to a bellows, piston, or other displacement indicating device, to which is attached an indicating pointer or other readout means. An example of such a system is found in U.S. Pat. No. 3,401,562, issued to W. A. Reaney. As material in the container causes compression of the sensor, the bellows or piston is caused to move in response. Such systems are subject to a major problem of temperature sensitivity, in addition to the fact of product bridging and the weakness of the horizontal forces developed in the product as discussed above, upon which such systems must rely for compression of their sensors.

In this type of prior art system, the entire fluid system including the sensor, interconnecting line, and the bellows or other readout device must be sealed from the atmosphere. Unfortunately, this renders the system highly susceptible to erroneous readings caused by temperature changes. When the temperature increases, the air in the system expands, giving erroneous readings, and vice versa when the temperature drops. Of course, use of a liquid instead of a gas as the working fluid would help in this respect, but it is generally not feasible to do so, because the density of the liquid would build up a significant pressure head in the elongate vertical sensor, requiring excessive and unrealistic displacement forces to be supplied by the material.

In order to overcome temperature problems, systems have been proposed in the prior art which include elaborate temperature compensating bellows, as shown in U.S. Pat. No. 3,290,938 issued to R. R. Miller for example. Unfortunately, this proposed solution leads to greater complexity and increased costs, and potentially increases the vulnerability of the system to leaks. In addition, it tends to clog.

Because the prior art fluid systems depend upon a completely sealed fluid system, the presence of even a minute leak will seriously affect long term accuracy. Although it is possible to build a system relatively free of gross leaks, the extent of the sensor, and the other tubes and devices involved in the measurement system makes it extremely difficult to guard against long term, slow leaks which will degrade accuracy over a period of weeks or months. As a generality, recalibration in this type of prior art system is not feasible, short of completely emptying or completely filling the container. Also, pressure does not activate these systems.

The present invention solves these and other problems existing in the art by providing an improved depth measurement system which takes advantage of the inherent simplicity and economies of a fluid system, but which works upon a different principle so as to avoid the problems heretofore existing in the art. Clogging of the components of my novel system is virtually non-existent.

SUMMARY OF THE INVENTION

With specific regard to the present invention, I have provided a system for measuring the depth, and hence the quantity of material in a container, such as a bin. My novel component reliably detects the presence or absence of liquid or solid materials ranging from fine powder to large diameter prill. My instrument was designed primarily for use in the dry bulk material industry, with fertilizer being but one example. By monitoring the level of material in cluster bins, multi-celled holding hoppers, above the weigh hoppers, it not only saves the cost of labor but it also eliminates the health hazards associated with humans in close proximity to heavy concentrations of mineral dust.

With regard to the minimization of dust, this is very important in the industry because close tolerance of the material is required by the United States Agricultural Department, and cross contamination, which occurs if one cell of a group overflows into the next, is not acceptable.

One embodiment of my sensor for use in determining the level of fill in a bin being filled comprises a housing or casing of generally Y shaped configuration. This housing has a central chamber, first and second upper orifices, and a single orifice at the bottom of the housing. An elongate primary hose is connected to the bottom orifice, in communication with the central chamber. A secondary hose of relatively small diameter is loosely contained within the primary hose, having a length slightly less than the length of the primary hose, with the remote ends of these hoses being comparatively closely associated, and separated by less than one foot.

One of the upper orifices of the housing is connected to a supply of air under pressure, and the other of the upper orifices is connected to pressure sensing equipment disposed at a remote location. The air under pressure added at one of the upper orifices normally flows outwardly and downwardly from one of the hoses, with such outward flow normally not affecting the pressure condition in the other of the hoses. However, upon the degree of the fill of the bin or container being such that material begins to closely approach the remote end of the primary hose, the air normally flowing out of one of the hoses is caused to be deflected into the remote end of the other of the hoses, and thus causing the pressure in such other hose to increase. Such pressure increase is sensed at the remotely located pressure sensing equipment, with this in turn being utilized to directly affect the rate of fill of the bin.

Regarding the prior art, the industry rarely employs any of the currently available indicators because they are not reliable under the conditions encountered. The working parts of instruments are quickly rendered inoperable by clouds of dust and sticky materials. Often the entire instrument becomes completely encased and they are susceptible to damage by being battered by the flow of material into and out of the bin. When it comes time to clean out a hopper, the standard procedure is to start from above and below by jabbing rods through it to acquire a through hole. This destroys anything in the hopper that is susceptible to destruction.

It is to be noted that electrical components, no matter how carefully sealed, whether in the hopper or located in the contaminated area above, do not last long. Even the placement of instruments presents a problem because what starts out well in a hopper soon gives trouble due to the constant changing of the pile characteristic.

Most indicators of the prior art incur high installation costs, especially in existing plants because of the problems found in just cleaning a hopper sufficiently enough to install a unit, attaching brackets and such, or the impossibility of installing through wall units in multiple celled hoppers. And the installation of electrical circuits in these areas is expensive and troublesome.

By the use of my novel system, all of the known problems of the prior art devices are avoided. The only part subjected to the harsh conditions in the bin is an elongate hose made of non-stick, abrasive resistant material that is self cleaning due to the flow of exhaust air. No moving parts are involved, or anything that can be harmed by either flowing material or cleaning equipment. The elongate hose I utilize in connection with my novel sensor (transducer) presents nothing for the material to cling to or build up on, and it automatically follows the flow path so that it requires no special care in placement or maintenance. Installation consists of dropping the hose operatively associated with my novel sensor into the hopper until it reaches the appropriate depth. There are no electrical components in or near the hopper, only low pressure air hoses. The diaphragm switch, known to the industry, that I utilize to operate signal devices and/or feed machinery is located well away from the contaminated area, taking its signal from a long, low pressure air hose.

Another unique advantage of my novel system is that it can be operated either with air from an air compressor, or from a blower. In fact, my novel sensor requires for its operation such a small amount of air, that a one horsepower blower can handle more than a dozen units. The blower can be located 50 or more feet away from the hopper, and the diaphragm switch can be an additional 50 feet away. Only low voltage, single phase power is required, and even including an indicator lamp, less than one ampere of current per unit is required.

Also important is that both installation and maintenance of my novel device requires no particular skill, but despite its non-complex configuration, it performs the task better, and at much lower cost, than any high tech equivalent.

It is thus a primary object of my invention to provide a sensor of uncomplicated, low cost construction, that can be effectively used for accurately determining the extent of fill in a bin.

It is another important object of my invention to provide a sensor or transducer of uncomplicated, low cost, non-clogging construction, that can be effectively used for accurately determining the extent of fill in a bin adapted to contain a wide range of different fill materials.

It is another object of my invention to provide a bin level sensor adapted to operate at a low level of pressurized air, making it unnecessary to utilize an air compressor for supplying the operating air needed for the operation of the sensor.

It is yet another object of my invention to provide a novel bin level indicator of simple construction, that does not need to be affixed to a wall of a bin for its operation, thus making it possible for my novel device to be used in multicell cluster hoppers, where ready access to the inner cells of the cluster is quite difficult.

It is yet still another object of my invention to present a sensor or transducer utilizing elongate, flexible hoses adapted to be lowered into a bin that contains material whose height or extent of fill is to be measured, which hoses contain no protrusions likely to contain an undesirable buildup of material.

It is still another object of my invention to provide a sensor having components are adapted to be lowered into a bin containing material whose height or extent of fill is to be measured, which sensor utilizes a signal tube that is recessed from the lower tip of the exhaust tube, thus to assure good signal pressure.

It is still another object of my invention to provide a sensor having components adapted to be lowered into a bin containing material whose height or extent of fill is to be measured, which sensor utilizes a signal tube that can be recessed for a variable extent with respect to the lower tip of the exhaust tube, thus to make it possible to obtain the best signal pressure for each different material whose depth in the bin is to be measured.

These and other objects, features and advantages of this invention will become more obvious as the description proceeds.

DETAILED DESCRIPTION

Figure 1:
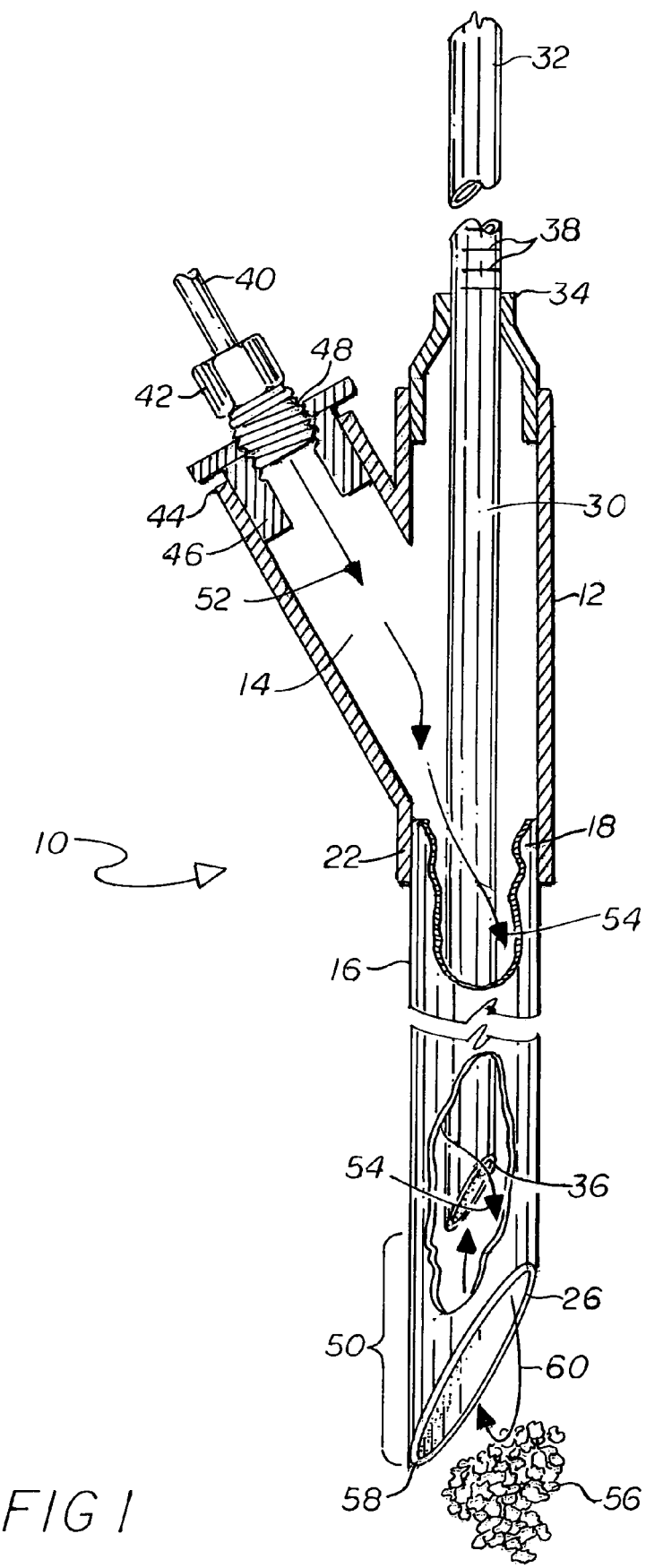
FIG. 1 is a side elevational view of a primary embodiment of my novel sensor or transducer, with certain portions cut away to reveal internal construction, and with arrows being utilized in order to show typical flow paths around the central chamber of the device.

With initial reference to FIG. 1, a first embodiment of my novel sensor 10 is illustrated, involving a housing or casing 12 in which a central chamber or bore 14 is defined. I may also refer to the device 10 as a transducer. The housing 12 may be of one-piece construction, and may be regarded as generally being in a "Y" shaped configuration and containing several apertures or orifices, to be described shortly. The housing 12 may be made of a suitable metal, or of an industrial grade plastic.

Figure 2:
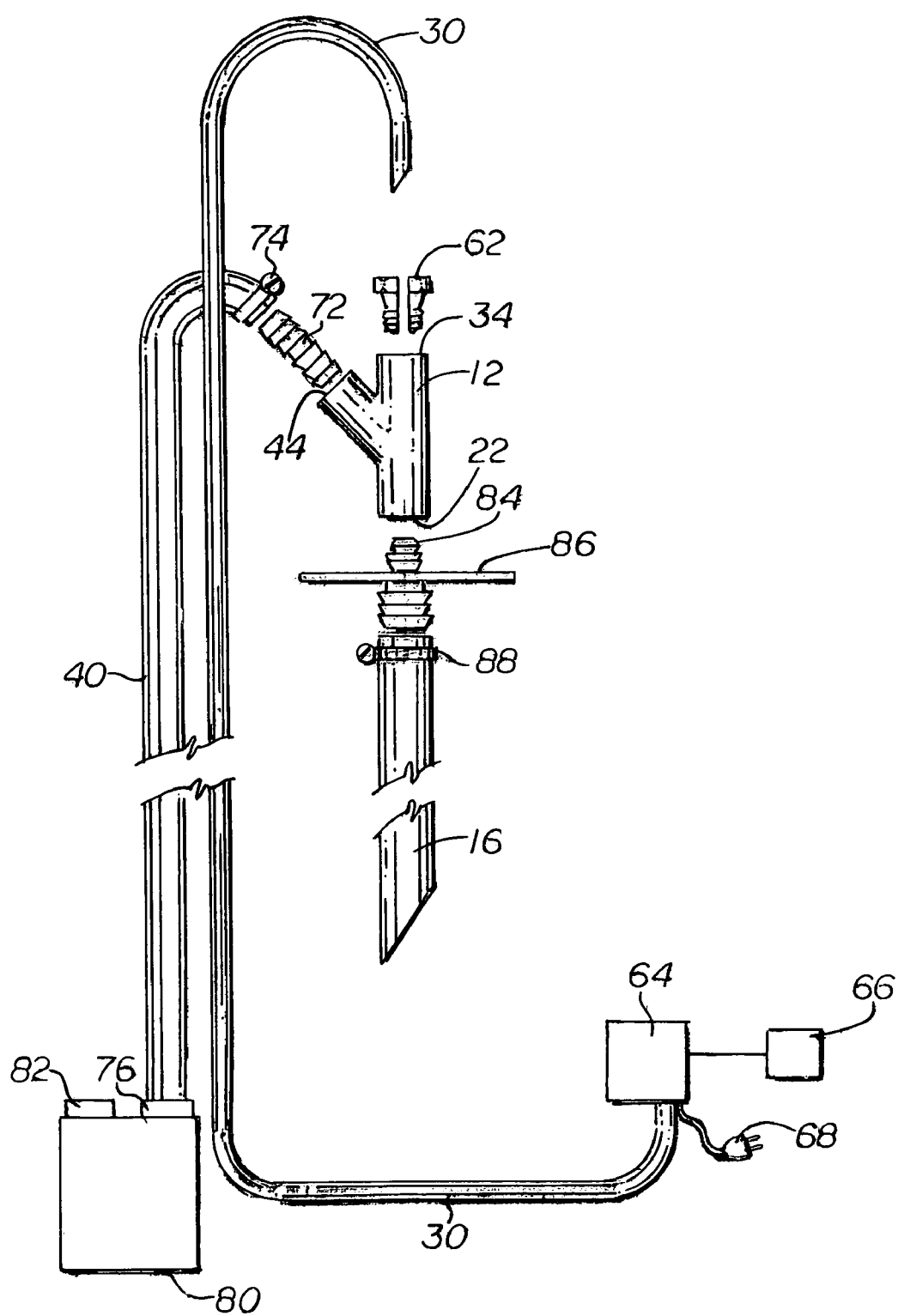
FIG. 2 is a type of exploded view revealing preferred constructional techniques utilized in connection with the housing portion of my novel sensor or transducer, with this view also showing certain ancillary components utilized in conjunction with my novel sensor or transducer.

Inasmuch as my novel sensor 10 is typically utilized in a vertical attitude in a bin whose fill level is to be measured on a moment-by-moment basis, I have depicted the sensor 10 in a vertical attitude in FIG. 1. In FIG. 2 I have presented an exploded view of the housing 12 and its associated components, and in FIG. 3 I have illustrated a typical single bin installation, with which my invention may be used. In FIG. 4 I have depicted a typical multiple bin installation or multicell cluster hopper, as will be discussed hereinafter.

Figure 3:
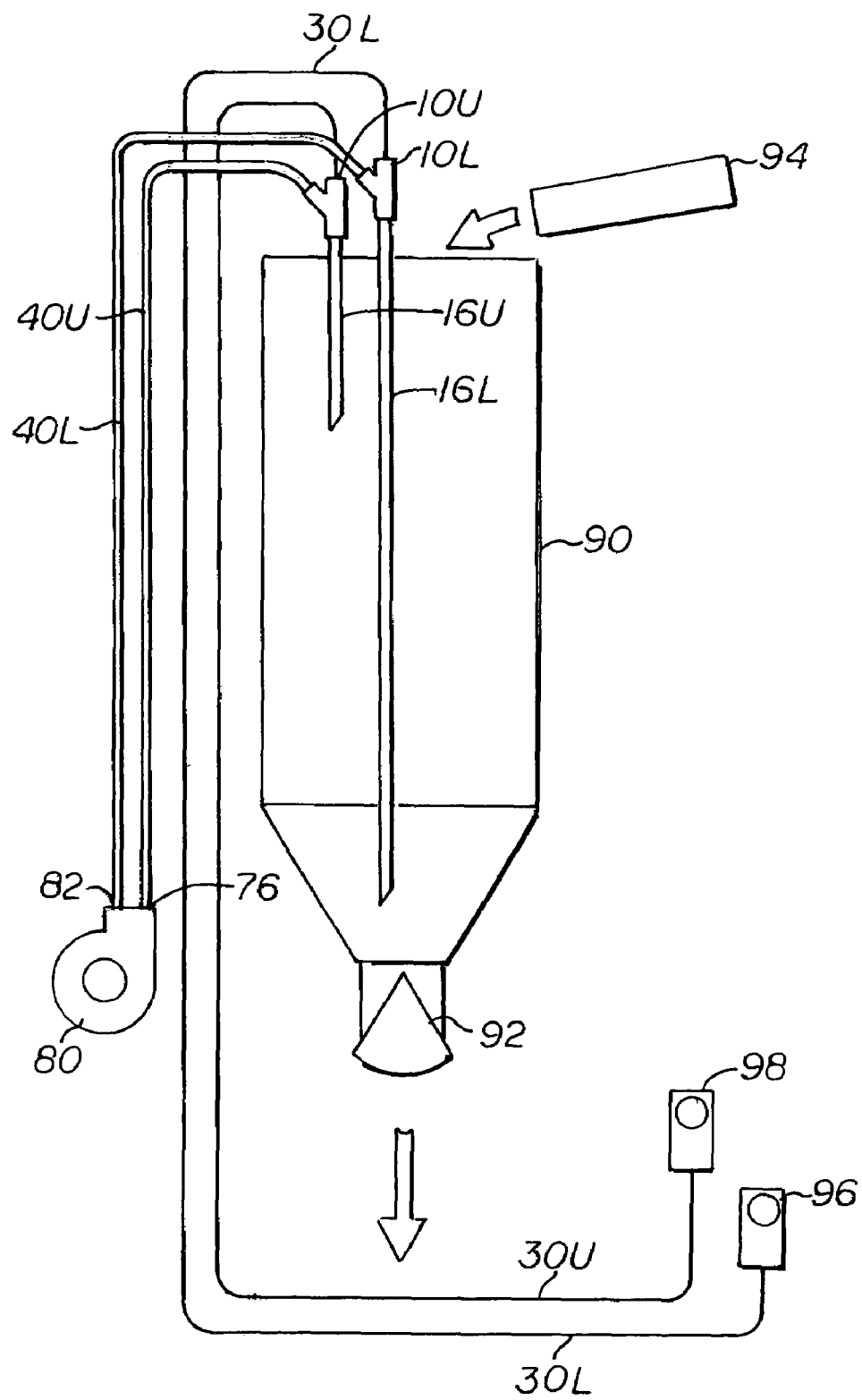
FIG. 3 is a simplified view of a typical single bin device, with this figure revealing that an elongate hose is utilized in conjunction with both the upper level and the lower level sensors, in order that information as to the fill of the bin can be transmitted to respective high limit and low limit switches.
Figures 4, 4A:
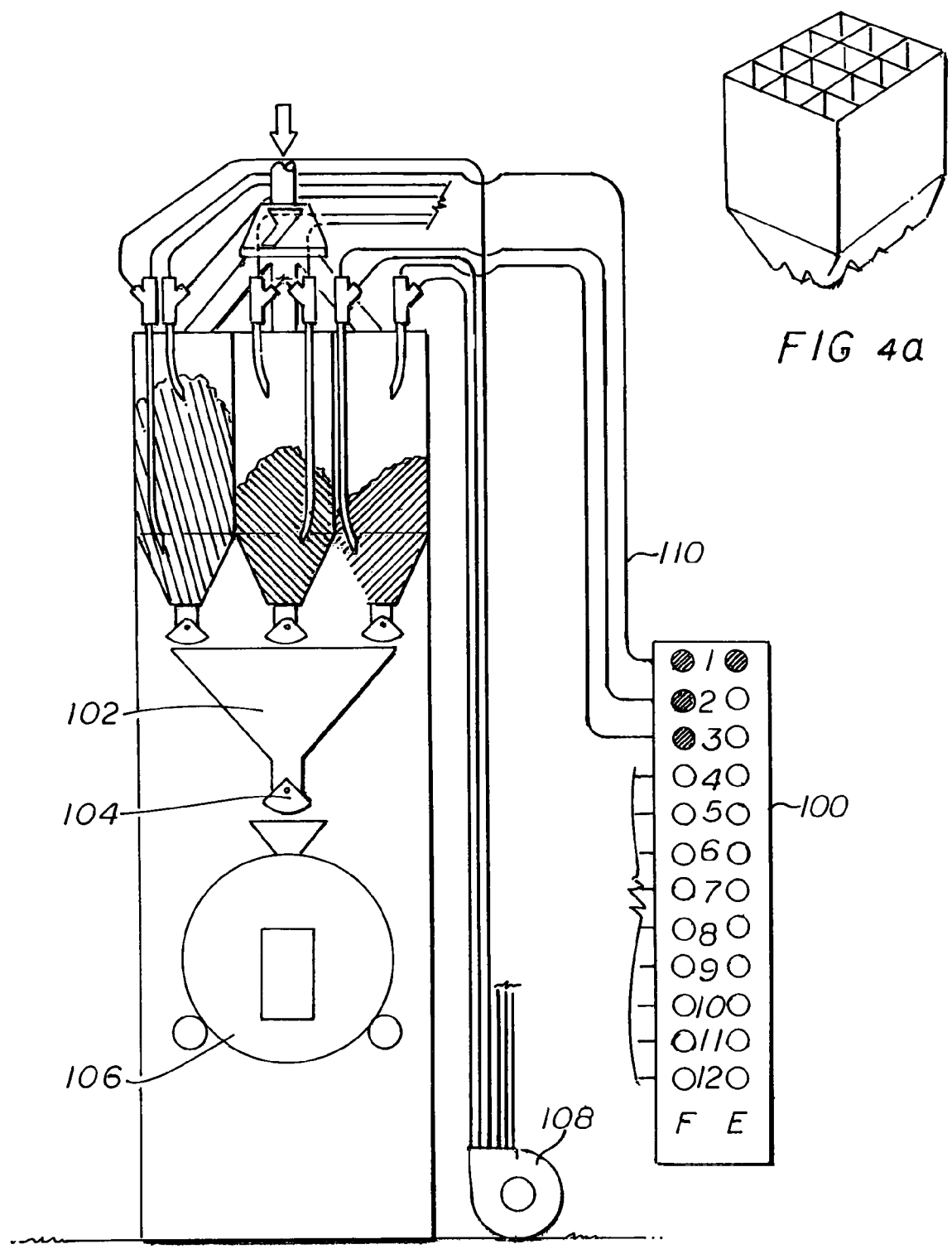
FIG. 4 is a simplified showing of a multiple cell cluster hopper arrangement of the type that may be utilized for the mixing of the desired ingredients to be incorporated into a commercial fertilizer, for example, in a desired ratio.

It is to be noted that in the usual instance, my novel sensor is utilized in pairs, with each sensor or transducer being utilized with an elongate hose designed to extend down into a bin whose fill level is to be monitored; note in FIG. 3 that elongate hoses of different lengths are depicted.

In FIG. 1 I have illustrated a portion of an elongate hose 16, regardable as being the primary hose which, in this instance, is shown to a substantially foreshortened length. The upper end 18 of the hose 16 is fitted tightly in lower aperture or orifice 22 of the housing 12, where the hose may be secured by a suitable clamp.

The lower end of the elongate primary hose 16, which is to be understood as disposed at a remote location with respect to the housing 12, may have an angled lower end 26, for a reason explained hereinafter. As will become obvious as the description proceeds, the elongate primary hose 16 is preferably flexible, and is intended to be dropped into a large bin being filled with particulate material, such as fertilizer; note FIG. 3.

A pair of my novel sensors (transducers) are to be observed in FIG. 3, and the angled lower end 26 of the hose 16L will be noted to be utilized near the lower part of the bin in FIG. 3, provided for the purpose of conveying of information regarding the bin becoming substantially empty. On the other hand, the end of the shorter hose 16U, intended to be used near the upper part of the bin or container depicted in FIG. 3, serves to convey information pertaining to the bin becoming substantially full.

With reference back to FIG. 1, which may be regarded as an important embodiment of my invention, this figure illustrates on what may be regarded as the principal axis of the housing 12, a signal tube 30. The tube 30 may also be referred to as the secondary hose or the relatively small diameter hose. This hose or signal tube 30 serves an important function insofar as the operation of my sensor is concerned.

A first end 32 of the signal tube, at which a suitable connector is typically used, may be regarded as extending to a remotely located pressure-responsive component or ingredient, such as to a diaphragm switch of a type that is well known in the art. My novel sensor or transducer 10 is intended to function with such a switch, but the diaphragm switch is not illustrated, for it does not itself form an intrinsic part of this invention. An example of the type of switch that may be used with my sensor is a device made by the Cleveland Controls Company of Cleveland, Ohio, Model No. AFS-222.

In accordance with the embodiment of my invention shown in FIG. 1, the signal tube 30 is designed to fit snugly in aperture 34 located in what may be regarded as the upper end of the sensor housing or body 12. The aperture 34 will also be hereinafter referred to as the first upper orifice. As will be noted from FIG. 1, the signal tube 30 extends downwardly the length of the central chamber 14 of the housing 12, and in addition, the signal tube 30 is of a length sufficient to extend for most of the length of the particular elongate primary hose 16 with which it may be used in a given instance.

Generally in the manner of the configuration of the lower end 26 of the hose 16, the lower end 36 of the secondary hose or signal tube 30 is preferably configured to have an angle similar to the angle of the lower end of the hose. The angles at which the ends 26 and 36 may be cut is preferably between 20° and 40°, with an angle of approximately 30° to the vertical being preferred. Advantageously, the angled tube ends serve to increase surface area, thereby permitting improved air flow by a factor of 1.5 to 2.0. In addition, the lower ends of hoses 16 and 30 almost never become clogged, as might well have taken place in certain instances when the ends of the primary and secondary hoses had been cut off straight. As will be seen from FIG. 1, I have designated the distance between the lower angled tip 36 of the secondary hose 30, and the lower angled tip 26 of the primary hose 16 as recess 50.

I am not limited to any fixed distance between the lower tip of the signal tube or hose 30 and the lower tip of the primary hose 16, but a typical distance or recess of 3½ inches usually brings about a good signal pressure. It is important to note that it is within the scope of this invention to provide a scale or indicia 38 on the visible upper end of the signal tube. Such calibrations 38 make it possible for an operator to readily select the optimum distance between the lower tip of the signal tube and the lower tip of the primary hose 16, without having to attempt to apply a measuring device to these lower components of the sensor.

In accordance with this first embodiment of my invention, air under pressure is to be inserted into a pipe or tube 40 that is attached to a fitting 42 located in an aperture or orifice 44 formed at the upper end of the housing 12. I will also refer to the orifice 44 as the second upper orifice.

As will be noted from FIG. 1, the pipe 40 and its fitting are disposed in an offset relationship to the aperture 34 of the housing 12, and to the previously mentioned principal axis of the housing. The aperture 44 in this offset branch of the housing 12 may be fitted with a plug 46, disposed in a fluid-tight relationship to the aperture 44. For example, the plug 46 may be equipped with internal screw threads, so as to tightly accommodate the fitting 42 that is equipped with matching male screw threads 48.

It is obvious that I am not to be limited to any particular offset, but by way of example, the branch of the housing containing the aperture 44 may be disposed at an angle of 45° to the principal axis of the housing.

As will be noted from the embodiment of my invention illustrated in FIG. 1, the path of the air under pressure entering the housing through the pipe 40 is represented by arrows 52, which indicate that the air under pressure flows downwardly through the chamber 14 and thereafter enters the interior of the primary hose 16. The curved arrows 54 reveal how the air under pressure may be regarded as flowing in a surrounding relationship to the signal tube or secondary hose 30. If nothing resides in the vicinity of the angled lower end of the hose 16, this compressed air will flow downwardly and outwardly, without restraint, through the angled lower end 26 of the primary hose.

It will be noted from a lower portion of FIG. 1 that I have indicated a small quantity of material 56, this representing a buildup of particulate material, such as fertilizer, in the upper part of the bin or other container in which my novel sensor is being utilized. As the bin continues to be filled with material, the fertilizer, or other such ingredient or material being added to the bin will, quite understandably, gradually approach the location of the angled lower end 26 of the primary hose 16. In such instance, instead of the air under pressure continuing to flow downwardly, this air under pressure, in the presence of the buildup of material 56, will be redirected upwardly, into the angled lower end 36 of the signal tube or secondary hose 30; note the curved arrow 60.

The approach of the material 56 to the lower tip 58 may be understood as causing an increase in pressure at the previously mentioned recess 50. This increase in pressure is sensed at the tip of the signal tube or secondary hose 30. In accordance with this embodiment, such pressure increase is transmitted up the tube 30 to the remotely located switch. When the switch (not shown) senses a sufficient increase in pressure, the filling procedure is caused, in a well understood manner, to cease.

It is to be noted that in accordance with another embodiment of my invention, the air flow arrangement may be reversed in order to enable a different type of material to be sensed. In accordance with this second embodiment, the previously-mentioned connector in the tube or hose 30 would be opened (broken), so as to be able to properly receive the pipe supplying compressed air at the first upper orifice 34. Continuing with this modification, the second upper orifice or aperture 44 in the offset portion of the housing 12 would be reconfigured to receive a proper connection to the remotely located pressure switch, or other readout device. I have found that when the level of an item such as pinto beans reside in the bin to be measured, it is advantageous for air to be admitted to the second upper orifice or aperture 44, as indicated in FIG. 1, whereas when the height of ground styrofoam residing in a bin is to be measured, it is more advantageous to supply the compressed air at the first upper orifice or aperture 34, and the remotely located readout device connected to the second upper orifice or aperture 44.

With reference now to FIG. 2, it will be seen that here I have shown a typical detector assembly, with FIG. 2 being an exploded view in order to illustrate preferred details of construction of an exemplary form of my invention.

In FIG. 2 the housing 12 is to be seen as receiving at its first upper orifice or aperture 34, a 1" PVC plug 62 that has been bored to a ½" inner diameter in order to receive the end of the signal tube 30, also known as the secondary hose. From this figure it will be noted that the signal tube leads to a signal box 64, disposed at a remote location, that contains an air switch. The signal box 64 is connected to a relay 66 that is in turn connected to a device, such as a screw drive, that is to be energized when the bin is to be filled. Also shown in this figure is an electric plug 68 used to supply electric power to the signal box 64.

Aperture 44, associated with the offset portion of the housing 12, is shown in conjunction with a 1" combination nipple 72, such as of schedule 80 PVC, equipped with threads configured to threadedly engage the threads of the aperture 44. It will be noted that the end of the nipple 72 opposite the threads is configured to readily receive the end of the earlier-mentioned blower hose or pipe 40 in a fluid tight manner. A suitable clamp 74 may be utilized to assure a tight connection.

In this illustrated instance I have shown the remote end of the blower pipe 40 connected to the outlet 76 of the blower 80, with the outlet 76 in this instance being associated with the high or upper detector, used to indicate the completion of the fill of the bin. It is to be noted that another connector, connector 82, is also provided on the blower 80, to which the hose (not shown) associated with the low detector of the bin is to be connected.

Continuing with FIG. 2, it will be noted that below the lower aperture 22 of the housing 12 is shown a 1" combination nipple 84, designed to fit tightly inside the lower aperture or orifice 22 of the housing 12. Also shown in this exemplary figure is a plate 86, such as of ¼" steel, that has an outer diameter of approximately 6". In the interior of this plate I have provided three evenly spaced ¼" holes (not shown) that are disposed ½" from the edge. This plate is utilized for sensor support.

The underside of the nipple 84 is provided with serrations to enable the upper end of the primary hose 16 to be tightly attached. A suitable hose clamp 88 may be used for this purpose.

With reference now to FIG. 3, it will be noted I have illustrated a pair of my novel sensors or transducers utilized in a typical bin 90, with transducer or sensor 10U serving as the high limit or upper detector, and the transducer or sensor 10L serving as the low limit detector. It will be noted that primary hose 16U extends downwardly from sensor 10U for a relatively short distance, whereas primary hose 16L extends for a relatively large distance downwardly from low limit sensor 10L. Also shown in this figure is a screw conveyor 94 utilized for loading the bin with the particulate material to be received in the bin or container 90. Typically the screw conveyor 94 is a two horsepower device which is energized at the time the bin is to be filled, that is, as observed by the low limit sensor 10L, and then de-energized when the bin is substantially full, as observed by the high limit or upper sensor 10U.

FIG. 3 involves the embodiment of my invention in which the offset apertures 44 of the sensors or transducers 10U and 10L are connected to the supply of air under pressure from the blower 80. More particularly, the lower end of pipe 40L connects to the low pressure blower outlet 82, whereas pipe 40U connects to the high pressure outlet 76 of the blower 80. In this way, the normal flow of air through the pipes 40L and 40U are supplied to the central chambers 14 of each of the pair of sensors 10U and 10L.

With regard to the blower design, I have found that a blower supplying 500 cubic feet of air per minute at a pressure of 10" of water will adequately supply my sensors, while drawing only 6.8 amperes of current. This relatively low current consumption is possible because my devices are advantageously designed to operate under low pressure, high volume conditions.

As an alternative to the use of a blower, an air compressor could be used if it can be regulated so as to supply air under low pressure. However, generally speaking, I have found that an air compressor is relatively ineffecient when providing air at low pressure.

Continuing with FIG. 3, the signal tube 30L is connected to the low limit switch 96, whereas signal tube 30U connects to the upper or high limit switch 98. A typical single clam gate is shown at 92.

The embodiment of my invention depicted in FIG. 3 represents an obvious difference from prior art designs, for the elongate hoses 16U and 16L present no area or location in which the material contained in the bin 90 can accumulate. Both gravity and the flow of material are significant in keeping the tips of the hoses or pipes clear. As depicted in FIG. 1, there is virtually no chance of material moving against gravity in order to gain entry to the recessed signal tube tip which, in the typical instance, is recessed approximately 3½" from the tip of the primary tube, as previously mentioned. However, I am not to be limited to this distance or measurement.

With reference back to FIG. 1, the amount of recess 50 is important for the obtaining of proper signal pressure. I have conducted extensive investigations of the relationships of the lower end of the signal tube or hose to the lower end of the primary tube or hose, and I have found that varying the amount of recess 50 can effect the pressure by as much as 0.2 inches of water. I have discovered that as the tip 36 of the signal tube 30 is advanced toward the angled lower end 26 of the primary hose 16 beyond a certain point, the signal pressure steadily decreases. After ascertaining the optimum relationship of the two tubes, which I call the "sweet spot," I have also found that the pressure decreases when the signal tube is pulled further away from the exhaust tube 16. From this it should be clear that I have found that fine grain adjustments of the amount of recess 50 is important for each of the various materials contained in the bin in order that the best signal pressure will be obtained. If desired, and as previously mentioned, it is possible that the easily visible upper end of the signal tube 30 can be calibrated as shown at 38 in FIG. 1, which of course is near the location where the tube or hose 30 enters the housing 12.

A most significant aspect of my invention is the fact that with the elongate, flexible primary hoses I use, there is very little likelihood of material sticking to the walls of the bins or hoppers and forming what may be regarded as a "cake." When this in the past happened, this caused the failure of instruments which in accordance with prior art design were bolted or otherwise rigidly attached to the walls of the bin or hopper.

Because the high level and low level hoses used in connection with my invention can be dropped into cluster hoppers, they are readily usable in multi-cell cluster hoppers. This of course was not possible in accordance with prior art devices needing to be attached to walls of a bin or hopper, which walls are virtually inaccessible with respect to the inner bins or hoppers of the cluster.

With reference now to FIG. 4, it is to be seen that high limit and low limit sensors in accordance with my invention may be used in pairs in a number of similar bins. For example, FIG. 4a schematically shows a twelve cell cluster of hoppers, with it to be understood that each bin or hopper utilizes a pair of my novel sensors.

It is well known in the fertilizer industry that a bag of fertilizer may contain many different ingredients. That these separate ingredients may be mixed in a proper ratio, one cluster hopper may contain murate of potash, whereas other hoppers of the cluster may contain Milorganite, ammonium nitrate, potassium nitrate, manganese, sludge, slag, sulphur, calcium nitrate, triple super phosphate, iron chelate, diammonium phosphate, magnesium, copper sulphate, boron, zinc, peanut hulls, corn cob, vermiculite, and the like.

In the typical instance, these various materials are loaded into the appropriate hoppers by a person operating a front end loader. This person must work rapidly, for the batch man is dropping these materials at a rate of two tons each minute. Consequently, it is most important that a hopper containing a particular ingredient must not be permitted either to run out of material, or become overrun by material.

For the convenience of the front end loader operator, a display is provided containing a number of pairs of indicator lights. The display 100 depicted in FIG. 4 preferably utilizes twelve lights in the left column, associated with the respective bins or hoppers becoming full, and twelve lights in the right column, associated with the respective bins or hoppers becoming empty. The color yellow means a given bin is not quite full, whereas the color red means that a bin is not quite empty. It is the goal of the front end loader operator to keep the lights turned off, thus indicating a normal, desirable operating condition.

Also visible in FIG. 4 is a conventional weigh scale 102, which is configured and positioned so as to receive the ingredients from the various hoppers or bins of the cluster. These bins may, for example, be 10 ton bins, with a pair of my novel sensors used in each bin; one sensor in each bin to develop the information indicating when a bin is nearing empty, and the other sensor in each bin to develop the information indicating when the bin is nearing a full condition.

When a sufficient weight of the ingredients from the several bins have been released into the weigh scale 102, the contents of the weigh scale are dropped, by the opening of the clam gate 104, into the conventional mixer 106, for subsequent mixing and then packaging.

The blower 108 depicted in FIG. 4 is equipped with a twelve outlet manifold, so that air under pressure may be delivered by respective lines or small conduits to the appropriate upper orifice of each sensor of the cluster. A signal line 110 connects the signal output from each sensor to the appropriate light of the display 100.

By now it should be apparent that I have provided a novel bin level indicator of simple construction, that does not need to be affixed to a wall of a bin for its operation, thus making it readily and conveniently possible for my novel device to be used in multicell cluster hoppers, where ready access to the inner cells of the cluster is quite difficult. Each of my novel sensors or transducers utilizes a pair of elongate, flexible hoses that can be easily lowered into a bin that contains material whose height or extent of fill is to be measured. Each sensor advantageously contains no protrusions likely to contain or develop an undesirable buildup of material.

It is obvious that the earlier-described modifications, as well as other modifications can be made to my invention, within the spirit and scope of the claims of my invention.

I claim:

1. A sensor for use in determining the level of fill in a bin being filled with material, said sensor comprising a housing having first and second upper orifices, and a lower orifice, said housing also having a central chamber, an elongate primary hose connected to said lower orifice, in communication with said central chamber, and a secondary hose contained within said primary hose, having a length slightly less than the length of said primary hose, with the remote ends of said hoses being separated by a distance of less than one foot, one of said upper orifices of said housing being connected to a supply of air under pressure, and the other of said upper orifices being connected to pressure sensing equipment disposed at a remote location, the air under pressure added at one of said upper orifices normally flowing outwardly and downwardly from one of said hoses, with such outward flow normally not affecting the pressure condition in the other of said hoses, but upon the degree of the fill of the bin being such that material begins to closely approach the remote end of said primary hose, the air normally flowing out of said one of said hoses is caused to be deflected into the remote end of the other of said hoses, and thus causing the pressure in such other hose to increase, such pressure increase being sensed at the remotely located pressure sensing equipment, with this in turn affecting the rate of fill of the bin.

2. The sensor as defined in claim 1 in which the air under pressure is admitted to the second of said upper orifices, and said secondary hose is connected to convey its output upwardly and outwardly from said first upper orifice, and on to the remotely located pressure sensing equipment.

3. The sensor as defined in claim 1 in which the air under pressure is admitted to the first of said upper orifices, and the pressure buildup in said primary hose is connected to convey its output upwardly and outwardly from said second upper orifice, and on to the remotely located pressure sensing equipment.

4. The sensor as defined in claim 1 in which the degree of separation of the remote ends of said hoses in less than four inches.

5. The sensor as defined in claim 1 in which the remote ends of said hoses are formed at an angle.

6. A sensor for use in determining the level of fill in a bin being filled, said sensor comprising a housing of generally Y shaped configuration and having a central chamber, said housing having first and second upper orifices, and a single lower orifice, an elongate primary hose connected to said lower orifice, in communication with said central chamber, and a secondary hose loosely contained within said primary hose, having a length slightly less than the length of said primary hose, with the remote ends of said hoses being separated by less than one foot, one of said upper orifices of said housing being connected to a supply of air under pressure, and the other of said upper orifices being connected to pressure sensing equipment disposed at a remote location, the air under pressure added at one of said upper orifices normally flowing outwardly and downwardly from one of said hoses, with such outward flow normally not affecting the pressure condition in the other of said hoses, but upon the degree of the fill of the bin being such that material begins to closely approach the remote end of said primary hose, the air normally flowing out of one of said hoses is caused to be deflected into the remote end of the other of said hoses, and thus causing the pressure in such other hose to increase, such pressure increase being sensed at the remotely located pressure sensing equipment, with this pressure increase in turn being utilized to modify the rate of fill of the bin.

7. The sensor as defined in claim 6 in which the air under pressure is admitted to the second of said upper orifices, and said secondary hose extends upwardly and outwardly from said first upper orifice, and thus to the remotely located pressure sensing equipment.

8. The sensor as defined in claim 6 in which the air under pressure is admitted to the first of said upper orifices, and the pressure buildup in said primary hose extends upwardly and outwardly from said second upper orifice, and thus to the remotely located pressure sensing equipment.

9. The sensor as defined in claim 6 in which the degree of separation of the remote ends of said hoses in less than four inches.

10. The sensor as defined in claim 6 in which the remote ends of said hoses are formed at an angle.

11. The sensor as defined in claim 6 in which a pair of sensors are employed in a bin being filled, with one sensor utilized to indicate when the bin is nearing an empty condition, and the other sensor utilized to indicate when the bin is nearing a filled condition.

12. A transducer for measuring the level of particulate material in a container, said transducer comprising a casing having a first upper aperture, a lower aperture, and a central bore, said first upper aperture and said lower aperture each being connected to said central bore, a relatively small diameter hose extending through said first upper aperture as well as through said lower aperture, said casing having an offset fitting disposed at a location between said first and lower apertures and providing a second upper aperture, with the aperture in said offset being in communication with said central bore, one of said upper apertures adapted to be connected to remotely located pressure sensing equipment, and the other of said upper apertures adapted to be connected to a supply of air under pressure, an elongate hose of relatively large diameter connected to said lower aperture of said casing, a portion of said relatively small diameter hose extending substantially coextensively along the interior of the relatively large diameter hose, but with the remote end of said relatively small diameter hose extending slightly less far than the remote end of the relatively large hose, the remote ends of the hoses being adapted to be suspended in the interior of a container of particulate material, air under pressure flowing out of the remote end of one of the hoses normally not manifesting itself in the end of the other hose, but upon the particulate material being added to the container reaching a level approaching the location of the remote end of the other hose, such material buildup causes an increase in the air pressure manifested in the remote end of the other of said hoses, which pressure is conducted back up such hose to the remotely located pressure sensing equipment, with this pressure increase in turn being utilized to modify the rate of fill of the container.

13. The transducer as defined in claim 12 in which the air under pressure is admitted to the second of said upper orifices, and said relatively small hose extends upwardly and outwardly from said first upper orifice, and on to the remotely located pressure sensing equipment.

14. The transducer as defined in claim 12 in which the air under pressure is admitted to the first of said upper orifices, and the pressure buildup in said relatively large diameter hose extends upwardly and outwardly from said second upper orifice, and on to the remotely located pressure sensing equipment.

15. The transducer as defined in claim 12 in which the degree of separation of the remote ends of said hoses in less than four inches.

16. The transducer as defined in claim 12 in which the remote ends of said hoses are each formed at an angle.

17. The transducer as defined in claim 12 in which a pair of such transducers are employed in a container being filled, with one transducer utilized to indicate when the container is nearing an empty condition, whereas the other transducer is utilized to indicate when the container is nearing a filled condition.

* * * * *